UNITED STATES PATENT OFFICE.

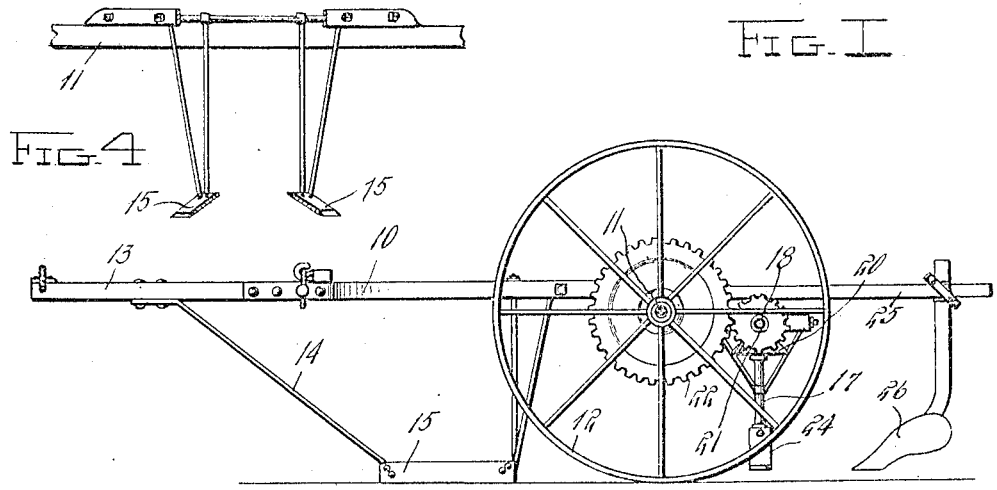
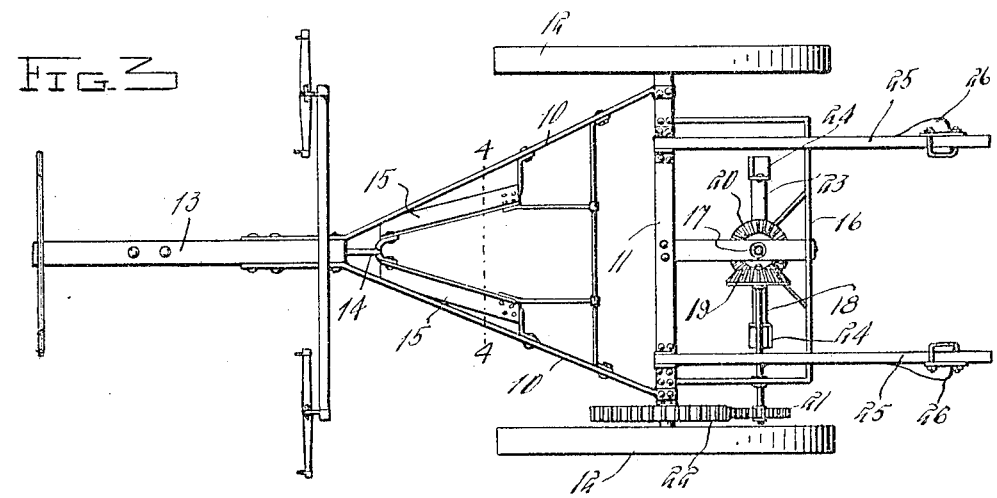
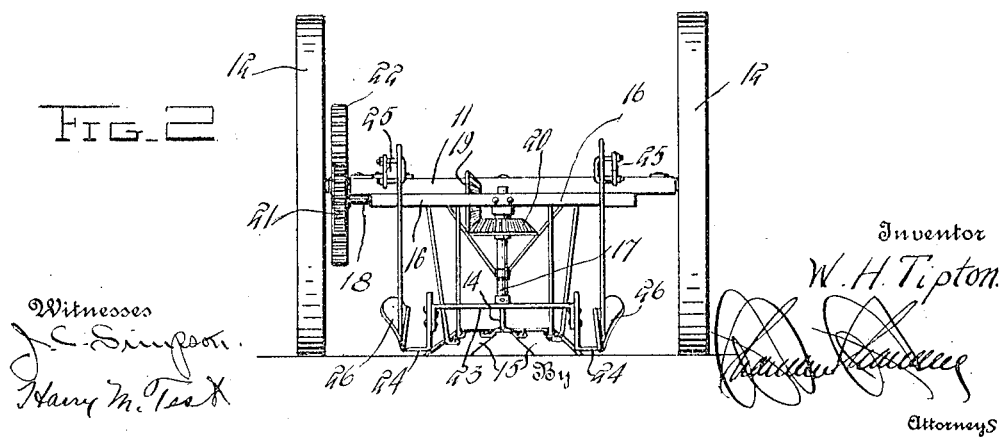

WILLIAM H. TIPTON, OF NEW SITE, MISSISSIPPI.

COTTON SCRAPER, CHOPPER, AND CULTIVATOR.

1,207,094.    Specification of Letters Patent.    Patented Dec. 5, 1916.

Application filed March 5, 1914. Serial No. 822,714.

*To all whom it may concern:*

Be it known that I, WILLIAM H. TIPTON, a citizen of the United States, residing at New Site, in the county of Prentiss, State of Mississippi, have invented certain new and useful Improvements in Cotton Scrapers, Choppers, and Cultivators; and I do hereby declare the following to be a full, clear, and exact description of the invention, such as will enable others skilled in the art to which it appertains to make and use the same.

This invention relates to improvements in machines for treating standing cotton plants, or the like.

One object of the invention is to provide a simple and novel machine which will scrape, chop, and cultivate the standing plants.

Another object is to provide a machine of this character which is durable in construction, effective in operation and which can be manufactured and sold at a comparatively low cost.

Other objects and advantages will be apparent from the following description, when taken in connection with the accompanying drawings.

In the drawings: Figure 1 is a side elevation of a machine made in accordance with my invention. Fig. 2 is a rear elevation of the same. Fig. 3 is a top plan view. Fig. 4 is a horizontal sectional view on the line 4—4 of Fig. 3.

Referring particularly to the accompanying drawings, 10 represents an approximately triangular frame having the base of the triangle disposed toward the rear and carrying an axle 11 on the ends of which are mounted the ground engaging supporting wheels 12. The forward part of the frame carries a draft tongue 13. Connected to the tongue 13 and extending rearwardly is a rod 14, to which rod are secured the scraper blades 15. Carried by the rear of the frame, and extending to the rear is a frame 16 in which is journaled a vertical rotating shaft 17. Disposed horizontally in the frame 16 is a shaft 18 which carries on its inner end a pinion 19 meshing with a pinion 20 carried by the shaft 17, and a pinion 21 on the other end meshing with a pinion 22 carried by the adjacent wheel 12. By this gearing arrangement motion is imparted to the vertical shaft 17 from the ground engaging wheel. Carried by the lower end of the shaft 17 is a cross bar 23, and secured to the ends of this bar are the chopping blades or hoes 24. Extending rearwardly from the frame 16 are the parallel beams 25, and secured to these beams are the cultivator shovels 26.

The device is a straddle row cultivator and cotton chopper and is driven down over the row of standing plants. As the machine proceeds down the row, the blades 15 perform their scraping action as is well understood. The gearing causes the rotation of the shaft 17, and as the blades or hoes 24 cross the row, they chop out the plants at regular intervals. Following the chopper are the cultivator shovels 26 which stir up and loosen the soil at the sides of the plants, thus forming a ridge of loosened soil the entire length of the row.

From the foregoing, it will readily be seen that I have provided a simple and efficient device for use in treating standing cotton or the like plants whereby scraping, chopping or thinning, and cultivating can be performed on the row of standing plants simultaneously with one and the same machine.

What is claimed is:

In a cotton chopping machine, the combination with a frame and an axle carried thereby, of a rearwardly extending substantially U-shaped bracket formed from a continuous metal strip having its ends secured to the axle, a blank extending from said axle to the transverse portion of the bracket, a rotary shaft suspended from said block and having its upper end journaled therein, gear connections between said axle and said shaft, said gear connections being also carried by said bracket, a transversely extending bar mounted at the lower end of said rotary shaft, and cotton chopping implements secured to the ends of said transverse bar.

In testimony whereof, I affix my signature, in the presence of two witnesses.

WILLIAM H. TIPTON.

Witnesses:
L. P. ALLEN,
E. CLAY WRIGHT.

Copies of this patent may be obtained for five cents each, by addressing the "Commissioner of Patents, Washington, D. C."